United States Patent
Storm et al.

(10) Patent No.: US 9,835,348 B2
(45) Date of Patent: Dec. 5, 2017

(54) SYSTEMS AND METHODS FOR CONTROLLING HUMIDITY

(75) Inventors: Timothy Wayne Storm, Tyler, TX (US); Carl L. Garrett, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 1253 days.

(21) Appl. No.: 13/045,735

(22) Filed: Mar. 11, 2011

(65) Prior Publication Data
US 2012/0228393 A1    Sep. 13, 2012

(51) Int. Cl.
| | | |
|---|---|---|
| F25B 13/00 | (2006.01) | |
| F25B 49/00 | (2006.01) | |
| F24D 19/10 | (2006.01) | |
| F24F 11/053 | (2006.01) | |
| G05D 21/00 | (2006.01) | |
| G05D 23/02 | (2006.01) | |
| F24F 7/00 | (2006.01) | |

(Continued)

(52) U.S. Cl.
CPC ...... *F24F 11/0015* (2013.01); *F24F 11/0008* (2013.01); *G05D 22/02* (2013.01); *F24F 2011/0064* (2013.01)

(58) Field of Classification Search
CPC .. F24F 3/14; F24F 6/00; F24F 11/0015; F24F 2003/14; F24F 2011/0015; F24F 2011/0086; G05D 22/00; F25B 30/02; F25B 2313/023; F25B 2313/02741; F25B 2700/02
USPC .......... 62/160, 176.1, 176.6, 324.1; 236/1 B, 236/1 C, 44 R, 44 C, 49.3, 51
See application file for complete search history.

(56) References Cited

U.S. PATENT DOCUMENTS

| | | | | |
|---|---|---|---|---|
| 4,013,118 A | * | 3/1977 | Zimmer | ............... F24F 11/0009 165/216 |
| 4,460,125 A | * | 7/1984 | Barker | .................... F23N 5/203 165/11.1 |

(Continued)

FOREIGN PATENT DOCUMENTS

| | | |
|---|---|---|
| CN | 101208563 A | 6/2008 |
| CN | 101903841 A | 12/2010 |

(Continued)

OTHER PUBLICATIONS

PCT International Search Report; PCT Application No. PCT/US2012/026114; dated Sep. 6, 2012; 4 pgs.

(Continued)

*Primary Examiner* — Henry Crenshaw
(74) *Attorney, Agent, or Firm* — Conley Rose, P.C.; J. Robert Brown, Jr.

(57) ABSTRACT

An HVAC system has a plurality of humidity sensors and a controller configured to selectively control which of the plurality of humidity sensors affects operation of the HVAC system. A method of controlling humidity includes providing a plurality of humidity sensors, assigning one of the plurality of humidity sensors as a humidity priority sensor, and affecting a humidity in response to feedback from the humidity priority sensor. A system controller for an HVAC system has an interface configured to present a plurality of humidity sensors and the system controller is configured to allow a user to select which of the plurality of humidity sensors affects operation of the HVAC system.

20 Claims, 7 Drawing Sheets

(51) Int. Cl.
*F24F 11/00* (2006.01)
*G05D 22/02* (2006.01)

(56) References Cited

U.S. PATENT DOCUMENTS

| | | | |
|---|---|---|---|
| 5,303,767 A * | 4/1994 | Riley | F24F 3/044 165/208 |
| 5,520,328 A * | 5/1996 | Bujak, Jr. | F24F 11/0017 165/209 |
| 5,931,376 A | 8/1999 | Meyer | |
| 6,032,472 A * | 3/2000 | Heinrichs | F04C 28/28 62/199 |
| 6,377,181 B1 | 4/2002 | Kroll et al. | |
| 6,711,471 B2 | 3/2004 | Kidder | |
| 6,935,570 B2 | 8/2005 | Acker, Jr. | |
| 7,168,627 B2 | 1/2007 | Kates | |
| 7,264,649 B1 | 9/2007 | Johnson et al. | |
| 7,513,438 B2 | 4/2009 | Mueller | |
| 8,019,567 B2 * | 9/2011 | Steinberg | F24F 11/0086 165/238 |
| 2002/0073628 A1* | 6/2002 | Dextras | E04B 1/7092 52/1 |
| 2004/0104222 A1* | 6/2004 | Lee | H05B 6/645 219/707 |
| 2005/0252983 A1 | 11/2005 | Acker, Jr. | |
| 2007/0144189 A1 | 6/2007 | Ishida et al. | |
| 2008/0029611 A1* | 2/2008 | Schnell | F24F 3/14 236/44 C |
| 2008/0061660 A1* | 3/2008 | Fleming | A47B 81/00 312/209 |
| 2008/0133061 A1* | 6/2008 | Hoglund | F24F 11/0012 700/277 |
| 2009/0076658 A1* | 3/2009 | Kinnis | F24F 11/0001 700/277 |
| 2010/0011612 A1 | 1/2010 | Jayne et al. | |
| 2010/0012737 A1* | 1/2010 | Kates | F24F 11/0012 236/49.3 |
| 2010/0070089 A1* | 3/2010 | Harrod et al. | 700/277 |
| 2010/0070907 A1* | 3/2010 | Harrod et al. | 715/772 |
| 2010/0082162 A1* | 4/2010 | Mundy | F24F 3/044 700/277 |
| 2010/0300284 A1* | 12/2010 | Bash | G05D 22/02 95/10 |
| 2011/0264277 A1 | 10/2011 | Shah et al. | |

FOREIGN PATENT DOCUMENTS

| | | |
|---|---|---|
| CN | 101952665 A | 1/2011 |
| WO | 2007139507 A1 | 12/2007 |
| WO | 2010050953 A1 | 5/2010 |

OTHER PUBLICATIONS

PCT Written Opinion of the International Searching Authority; PCT/US2012/026114; dated Sep. 6, 2012; 6 pgs.

PCT International Preliminary Report on Patentability; Application No. PCT/US2012/026114; dated Sep. 26, 2013; 8 pages.

Canadian Office Action; Application No. 2,828,208; dated Jan. 14, 2015; 4 pages.

Chinese Office Action; Application No. 201280012482.1; dated Apr. 21, 2016; 8 pages.

Chinese Office Action; Application No. 201280012482.1; dated May 6, 2015; 24 pages.

Chinese Office Action; Application No. 201280012482.1; dated Dec. 15, 2015; 25 pages.

Canadian Office Action; Application No. 2,828,208; dated Aug. 18, 2015; 4 pages.

* cited by examiner

SYSTEMS AND METHODS FOR CONTROLLING HUMIDITY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Poorly controlled indoor humidity may contribute to property damage and/or may negatively impact an indoor occupant's level of comfort. Some heating, ventilation, and air conditioning (HVAC) systems comprise a humidity sensor that provides feedback related to a measured indoor humidity to a system controller of the HVAC system. Some HVAC systems utilize feedback from the humidity sensor to control operation of the HVAC system in an effort to affect or otherwise control the indoor humidity.

SUMMARY OF THE DISCLOSURE

In some embodiments of the disclosure, an HVAC system is provided that comprises a plurality of humidity sensors and a controller configured to selectively control which of the plurality of humidity sensors affects operation of the HVAC system.

In other embodiments of the disclosure, a method of controlling humidity is disclosed. The method comprises providing a plurality of humidity sensors, assigning one of the plurality of humidity sensors as a humidity priority sensor, and affecting a humidity in response to feedback from the humidity priority sensor.

In yet other embodiments of the disclosure, a system controller for an HVAC system is disclosed. The system controller comprises an interface configured to present a plurality of humidity sensors. The system controller may be configured to allow a user to select which of the plurality of humidity sensors affects operation of the HVAC system.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Some HVAC systems comprising a humidity sensor use feedback from the humidity sensor to control indoor humidity. In some HVAC systems, a humidity sensor is integrated into a thermostat and/or system controller and is generally colocated with the thermostat and/or system controller. In some applications, colocation of the humidity sensor and the thermostat and/or system controller may not provide sufficient response time to changes in indoor humidity, in some cases, because a source and/or sink of humidity may be located significantly remote from the humidity sensor. Accordingly, this disclosure provides systems and methods for increasing an HVAC system response time to changes in indoor humidity by providing multiple humidity sensors and allowing a user and/or a system controller of the HVAC system to select which of the multiple humidity sensors will substantially affect operation of the HVAC system.

Figure 1:
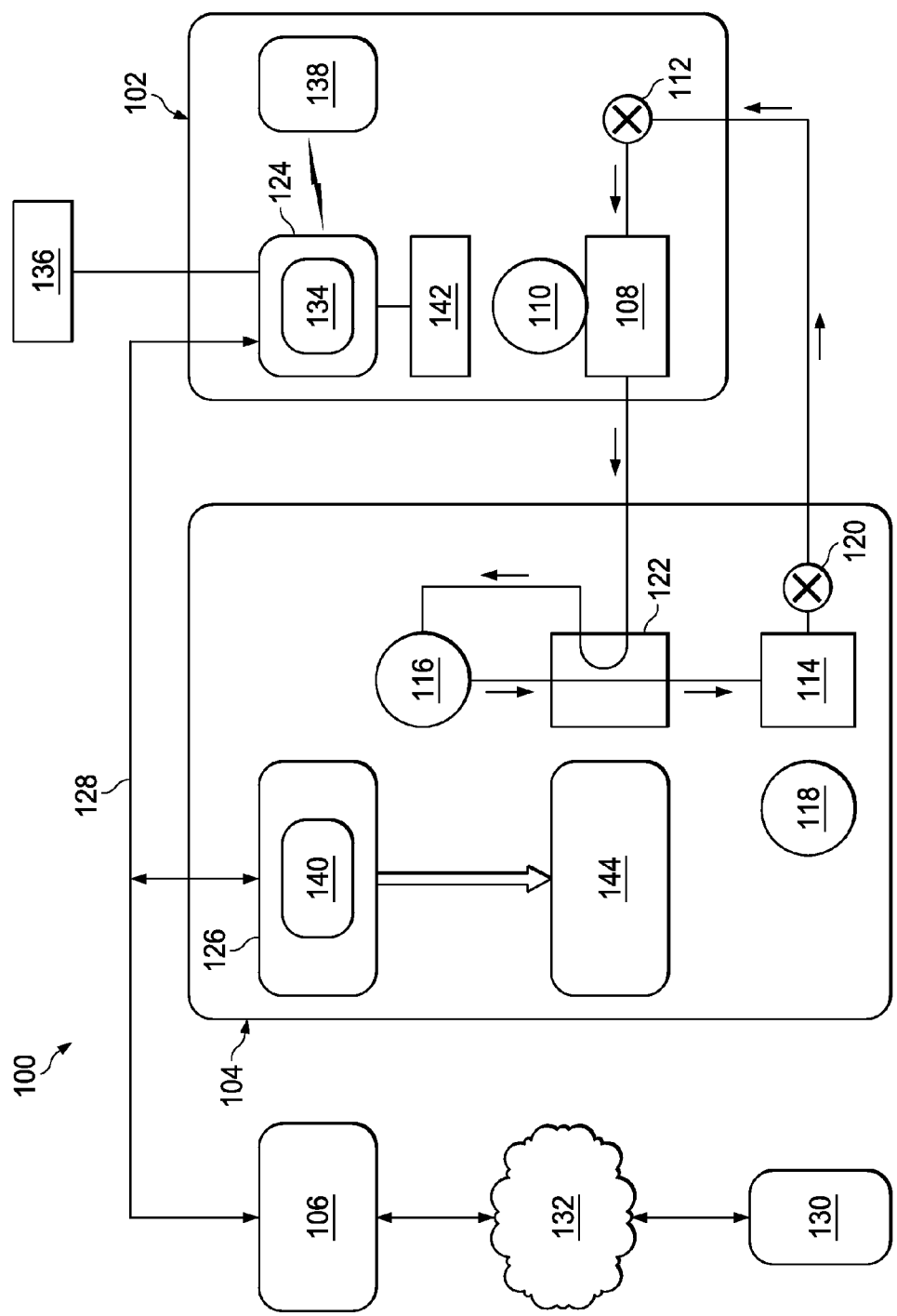
FIG. 1 is simplified schematic diagram of an HVAC system according to an embodiment of the disclosure.

Referring now to FIG. 1, a simplified schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
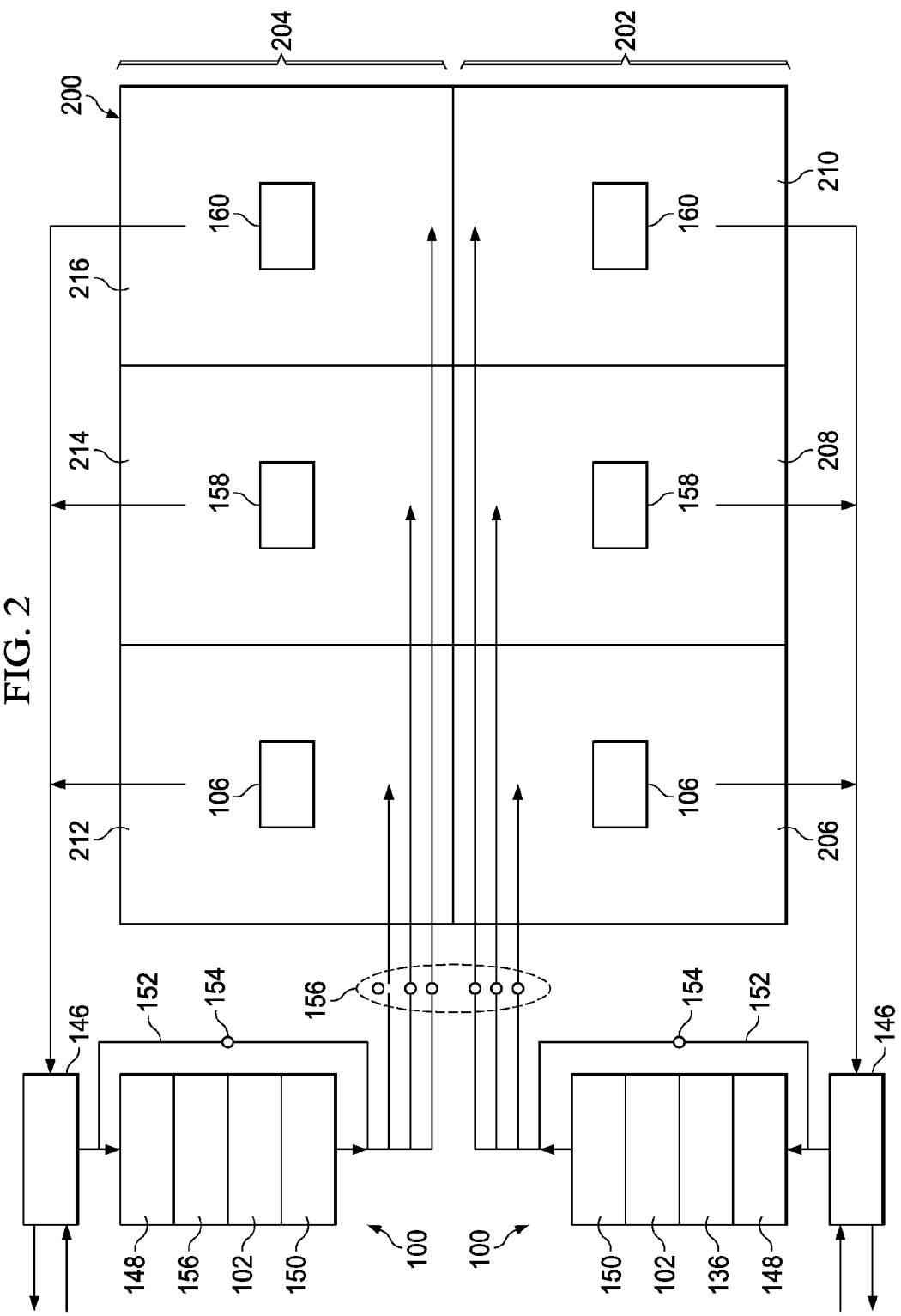
FIG. 2 is a simplified schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100.

Figure 3:
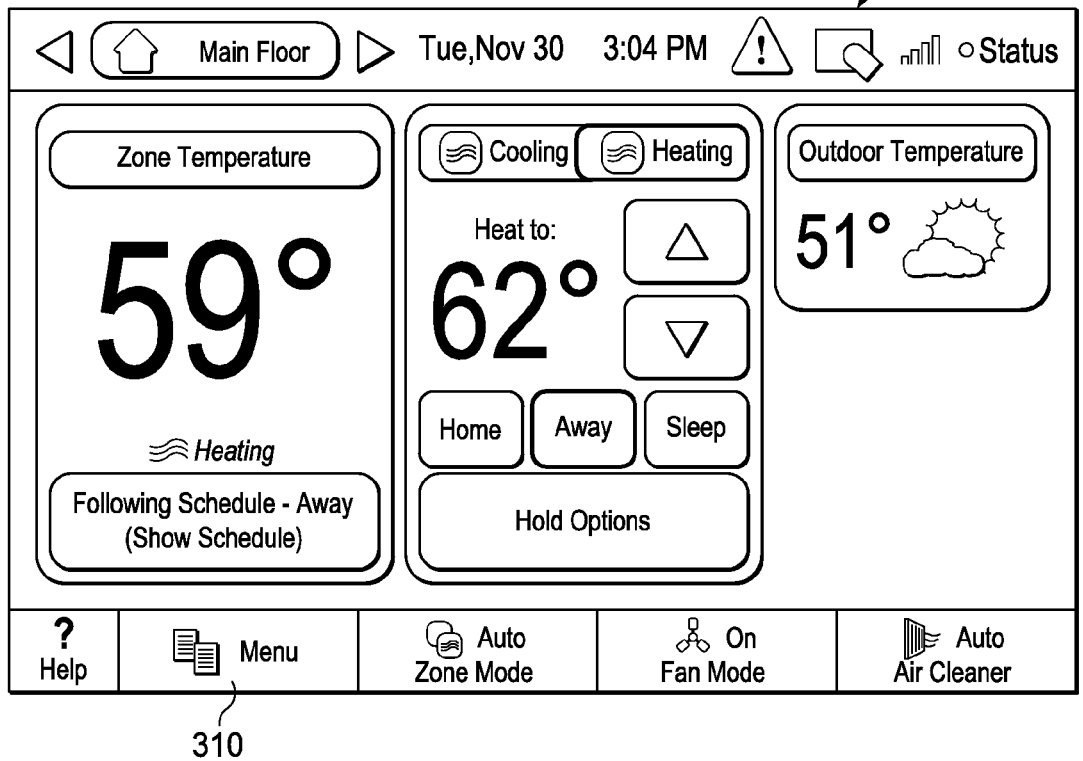
FIG. 3 is a home display of a system controller of the HVAC system of FIG. 1.

Referring now to FIG. 3, a home display 300 of system controller 106 is shown. The home display 300 may display a measured temperature of a zone associated with air supplied by the HVAC system 100, indications of whether the HVAC system 100 is operating in a heating or cooling mode, a current heating and/or cooling temperature set point, a measured outdoor and/or ambient temperature, other HVAC system 100 operational settings, and/or other HVAC system 100 status information. The home display 300 comprises a virtual button 310. The virtual button 310 is selectively operable to cause the system controller 106 to present a main menu 400 as shown in FIG. 4.

Figure 4:
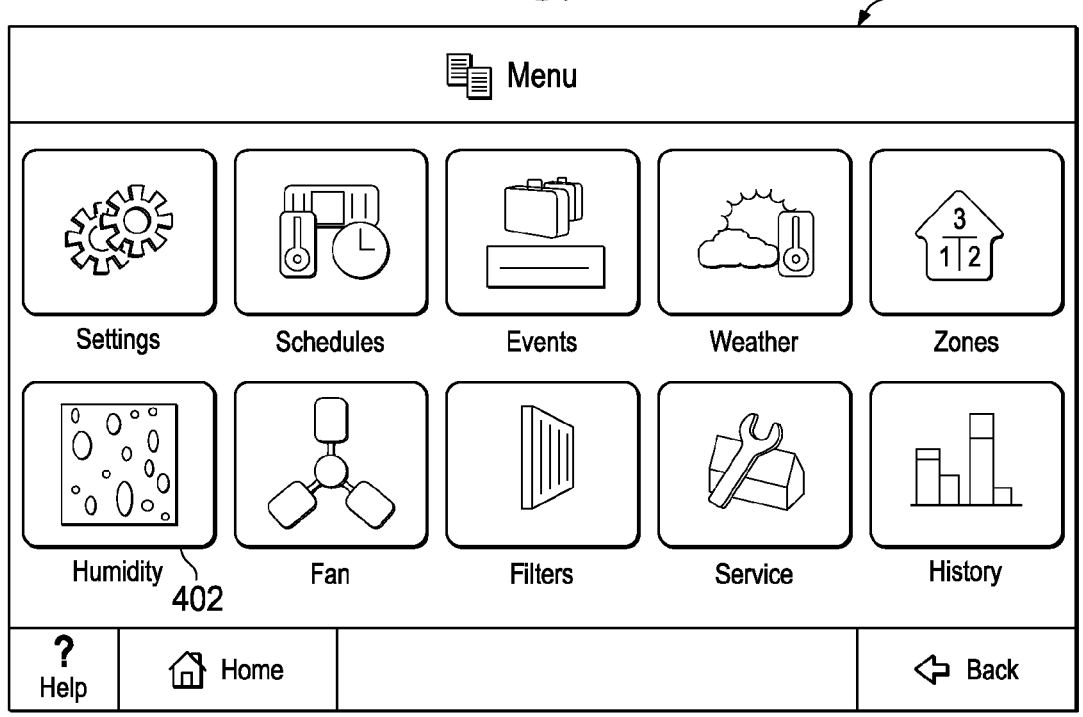
FIG. 4 is a main menu of the system controller of the HVAC system of FIG. 1.

Referring now to FIG. 4, the main menu 400 comprises a plurality of virtual buttons configured to allow a user to navigate to a plurality of additional menus and displays. The main menu 400 comprises a virtual button 402 that is selectively operable to cause the system controller 106 to present a humidity menu 500 of FIG. 5.

Figure 5:
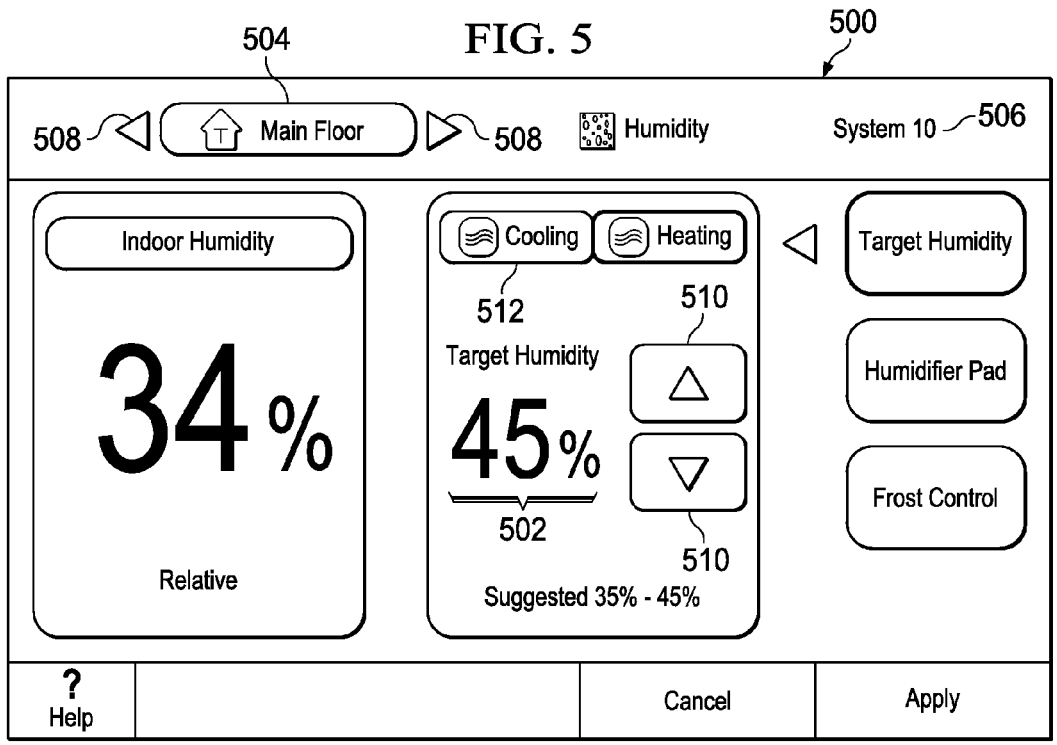
FIG. 5 is a humidity menu of the system controller of the HVAC system of FIG. 1 showing a heating mode setting.

Referring now to FIG. 5, humidity menu 500 is shown as displaying humidity settings associated with a heating mode of operation of the HVAC system 100. The humidity menu 500 may allow a user to designate an indoor target humidity 502 for association with a humidity sensor associated with a zone (represented by a virtual button 504) of a system (represented by a virtual button 506). In some embodiments, the user may set an indoor target humidity 502 for other zones by first causing another zone to be displayed. In some embodiments, a user may selectively operate virtual buttons 508 to successively display other zones having humidity sensors associated with them. In some embodiments, a user may be allowed to designate a particular indoor target humidity 502 by one of directly entering a desired value or selecting a desired value from a range of allowed values. For example, a user may be allowed to select any value from 10% to 60% in 5% increments by selectively actuating virtual buttons 510. Of course, in alternative embodiments, the ranges of available values may vary by having an available value of lower than 10%, above 60%, and/or in increments other than 5% increments. In some embodiments, a user may operate a virtual button 512 to cause the system controller 106 to display humidity settings associated with a cooling mode of operation of the HVAC system 100.

Figure 6:
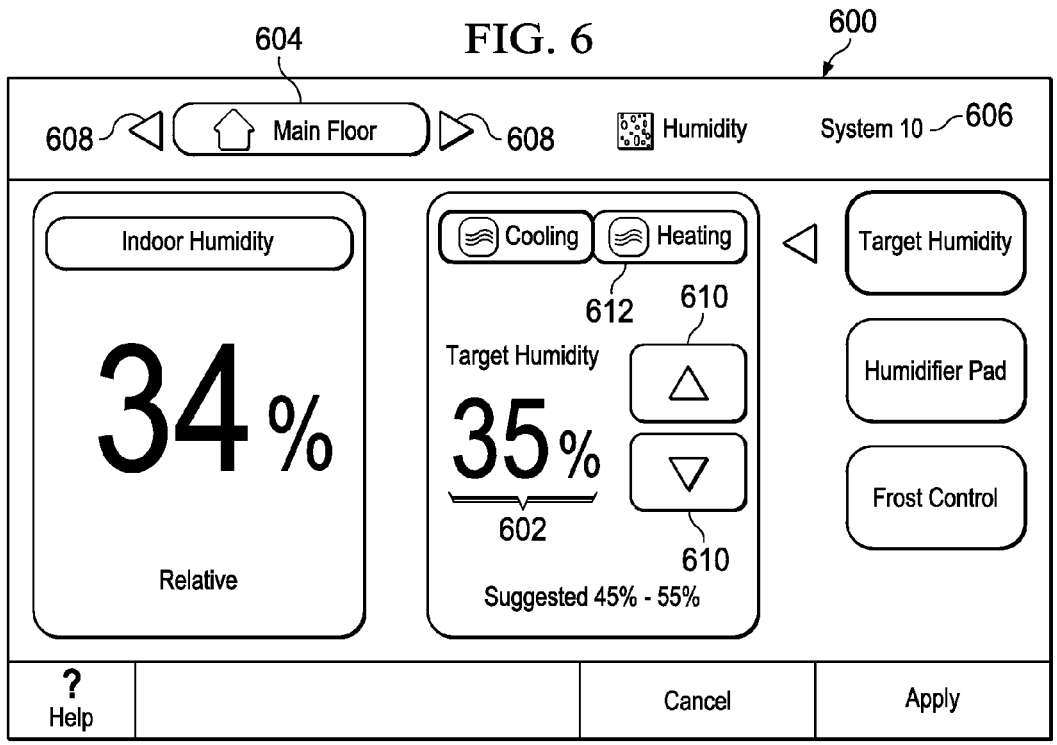
FIG. 6 is a humidity menu of the system controller of the HVAC system of FIG. 1 showing a cooling mode setting.

Referring now to FIG. 6, humidity menu 600 is shown as displaying humidity settings associated with a cooling mode of operation of the HVAC system 100. The humidity menu 600 may allow a user to designate an indoor target humidity 602 for association with a humidity sensor associated with a zone (represented by a virtual button 604) of a system (represented by a virtual button 606). In some embodiments, the user may set an indoor target humidity 602 for other zones by first causing another zone to be displayed. In some embodiments, a user may selectively operate virtual buttons 608 to successively display other zones having humidity sensors associated with them. In some embodiments, a user may be allowed to designate a particular indoor target humidity 602 by one of directly entering a desired value or selecting a desired value from a range of allowed values. For example, a user may be allowed to select any value from 20% to 80% in 5% increments by selectively actuating virtual buttons 610. Of course, in alternative embodiments, the ranges of available values may vary by having an available value of lower than 20%, above 80%, and/or in increments other than 5% increments. In some embodiments, a user may operate a virtual button 612 to cause the system controller 106 to display humidity settings associated with the heating mode of operation of the HVAC system 100.

Figure 7:
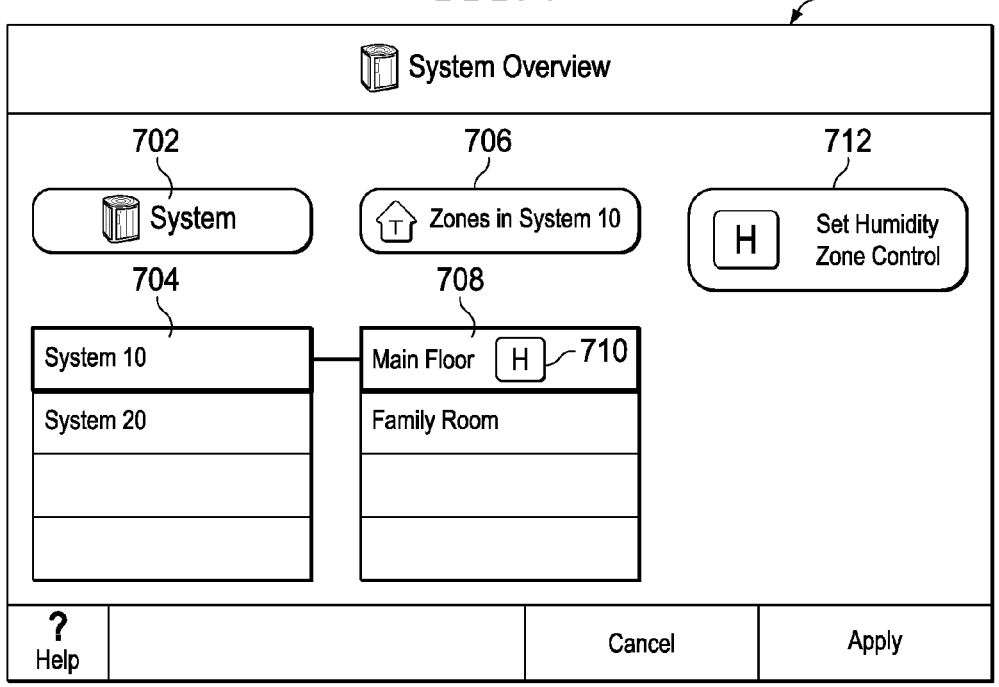
FIG. 7 is a humidity system overview menu of the system controller of the HVAC system of FIG. 1 showing a first zone of a first system as a humidity priority zone for the first system.

Referring now to FIG. 7, a humidity system overview menu 700 is shown. In some embodiments, a user may cause the system controller 106 to display the humidity system overview menu 700 by operating either one of the above-described virtual buttons 506, 606. The humidity system overview menu 700 may display a system list 702 comprising a listing of HVAC systems 100 viewable and/or controllable by the system controller 106. Selection of a first HVAC system 100 represented as a virtual button 704 may populate a zone list 706 comprising a listing of zones associated with the first HVAC system 100. In some embodiments, the first HVAC system 100 may comprise two zones, only one of which may be designated as a humidity priority zone. In the embodiment shown, a first zone (represented by a virtual button 708) is designated as the humidity priority zone. In some embodiments, the zone designated as the humidity priority zone may be indicated by the inclusion of a graphical icon and/or other humidity priority indicia 710. A virtual button 712 may be operated to display a humidity zone selection menu 800.

Figure 8:
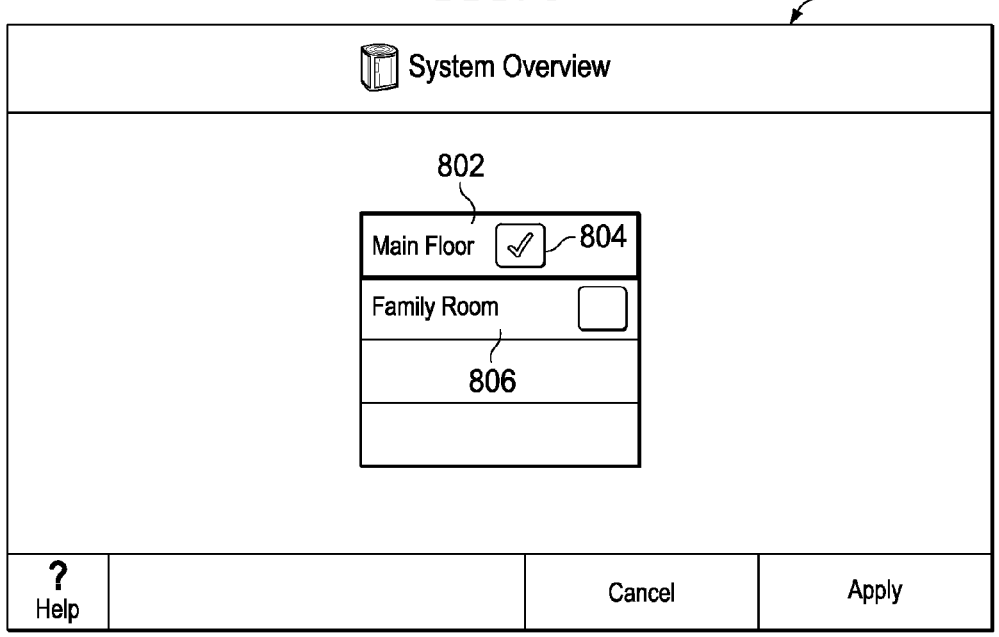
FIG. 8 is a humidity zone selection menu of the system controller of the HVAC system of FIG. 1.

Referring now to FIG. 8, a humidity zone selection menu 800 associated with the HVAC system 100 displaying a virtual button 802 is shown. In this embodiment, the zone designated as the humidity priority zone (represented by virtual button 802) comprises a humidity priority indicia 804. A second zone (represented by a virtual button 806) may be selectively assigned as the humidity priority zone by operating the virtual button 806. The operation of the virtual button 806 may assign the second zone of the first HVAC system 100 as the humidity priority zone and may further cause the system controller 106 to display a humidity system overview menu 900.

Figure 9:
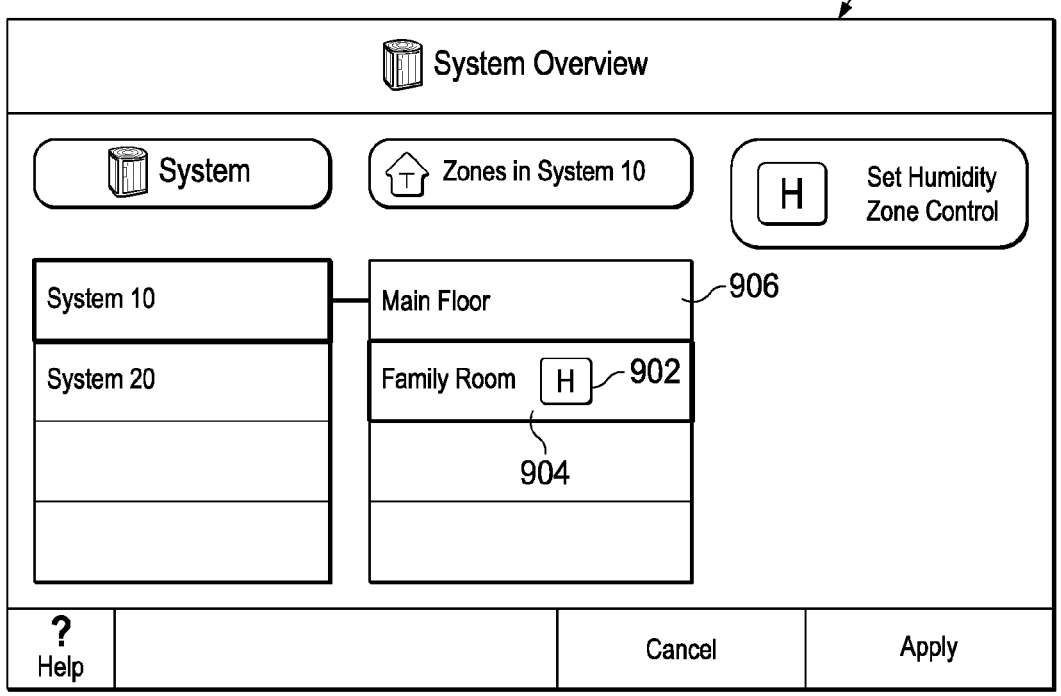
FIG. 9 is a humidity system overview menu of the system controller of the HVAC system of FIG. 1 showing a second zone of the first system as a humidity priority zone for the first system.

Referring now to FIG. 9, the humidity system overview menu 900 which is substantially similar to the humidity system overview menu 700 is shown. However, because assignment of the humidity priority zone is different in the settings displayed in the humidity system overview menu 900 as compared to the humidity system overview menu 700, a humidity priority indicia 902 is associated with the second zone of the first HVAC system 100 (represented by a virtual button 904) rather than remaining associated with the first zone of the first HVAC system 100 (represented by a virtual button 906).

Figure 10:
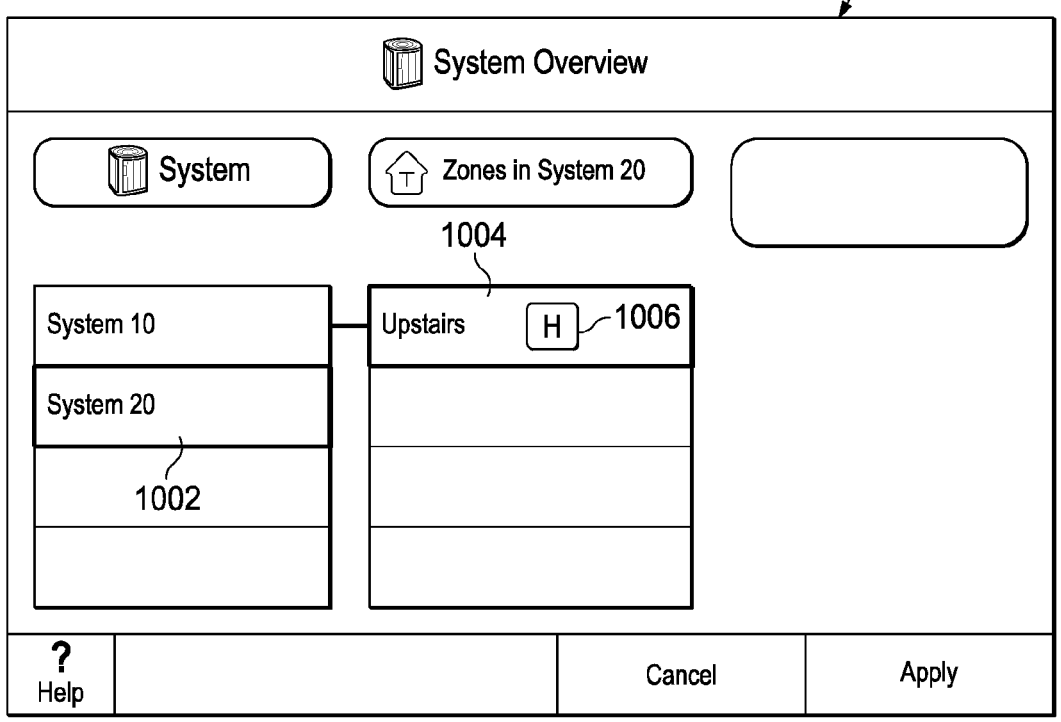
FIG. 10 is a humidity system overview menu of the system controller of the HVAC system of FIG. 1 showing a first zone of a second system as a humidity priority zone for the second system.

Referring now to FIG. 10, a humidity system overview menu 1000 substantially similar to the humidity system overview menus 700, 900 is shown. However, the humidity system overview menu 1000 displays a second HVAC system 100 (represented by a virtual button 1002) as being selected instead of the first HVAC system 100. The only zone of the second HVAC system 100 (represented by a virtual button 1004) is also displayed. In this embodiment, the only zone of the second HVAC system 100 is indicated as being assigned as the humidity priority zone for the second HVAC system 100. Such designation is indicated by the association of a humidity priority indicia 1006 with the virtual button 1004.

Figure 11:
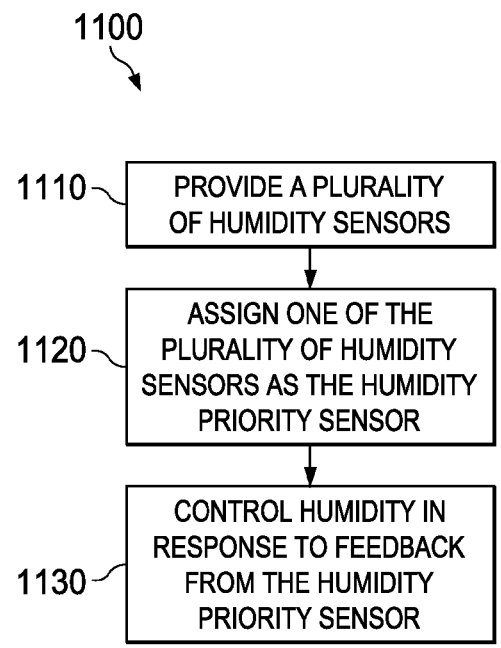
FIG. 11 is a simplified flowchart of a method of controlling humidity according to an embodiment of the disclosure.

Referring now to FIG. 11, a simplified flow chart of a method 1100 of controlling humidity is shown. The method 1100 may be implemented at a processing component of the system controller 106. The method 1100 starts at block 1110 by providing a plurality of humidity sensors for use with one or more HVAC systems 100. As described above, humidity sensors may be associated and/or colocated with one or more system controllers 106, zone thermostats 158, zone sensors 160, and/or any other suitable component. In some embodiments, humidity sensors may be provided and/or located in and/or near particularly problematic humidity sources and/or sinks. For example, a humidity sensor may be provided in a kitchen area, bathroom, exercise room, and/or any other room, zone, and/or area commonly associated with relatively large and/or relatively fast fluctuations in humidity. After providing the humidity sensors, the method may progress to block 1120.

At block 1120, one of the plurality of humidity sensors may be assigned as the humidity priority sensor. In some embodiments, a user may select one of the humidity sensors and cause the selected humidity sensor to be assigned as the humidity priority sensor. In other embodiments, the system controller 106 and/or any other suitable component may monitor humidity using humidity sensors and automatically assign one of the humidity sensors as the humidity priority sensor based on historical feedback from one or more of the plurality of humidity sensors. In some embodiments, as shown in FIGS. 4-10, each HVAC system 100 may be required to use one of its own humidity sensors as the humidity priority sensor that will control the HVAC system 100. However, in alternative embodiments, a first HVAC system 100 may be configured to use a humidity sensor of a second HVAC system 100 as the humidity priority sensor for the first HVAC system 100. After assignment of a humidity sensor as a humidity priority sensor, the method 1100 may progress to block 1130.

At block 1130, the method 1100 may proceed to operate the HVAC system 100 in response to feedback from the assigned humidity priority sensor. In some embodiments, operation of the HVAC system 100 may comprise controlling the HVAC system 100 to reduce humidity in response to a measured humidity being greater than a target humidity. In some embodiments, operation of the HVAC system 100 may comprise controlling the HVAC system 100 to increase humidity in response to a measured humidity being less than a target humidity. It will be appreciated that operation of the HVAC system 100 and response to the feedback from the assigned humidity priority sensor may comprise operation of the HVAC system 100 in a cooling mode, a heating mode, a ventilation mode, activation of a humidifier, activation of a dehumidifier, and/or any other suitable manner of operation to affect indoor humidity.

Figure 12:
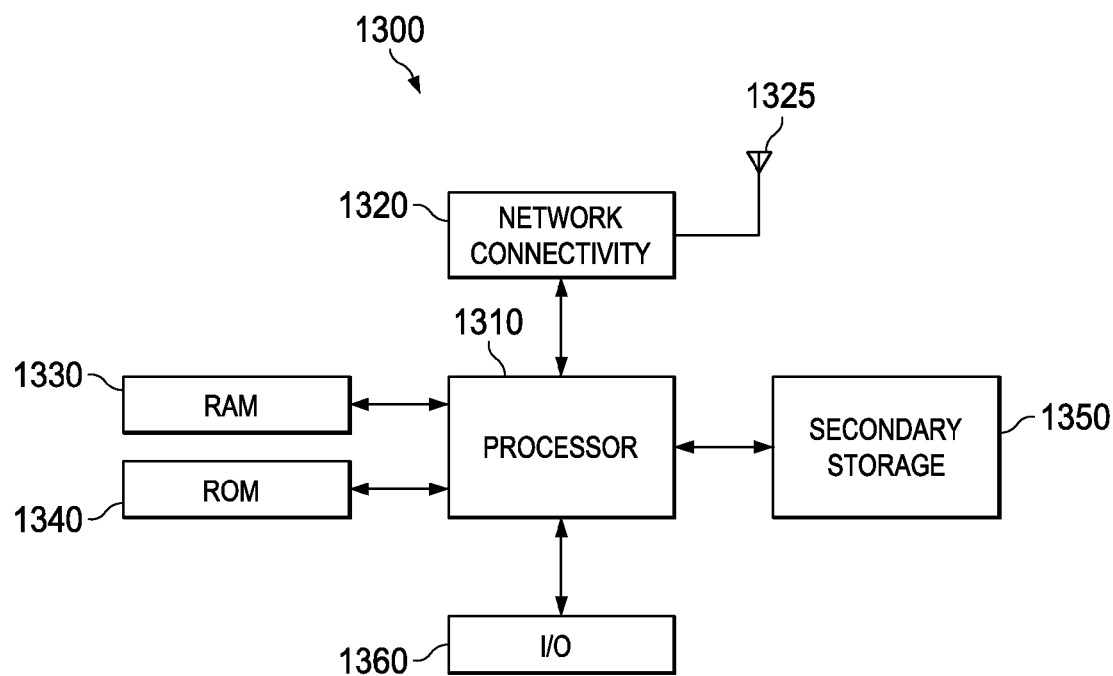
FIG. 12 is a simplified representation of a general-purpose processor (e.g., electronic controller or computer) system suitable for implementing the embodiments of the disclosure.

FIG. 12 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

It will be appreciated that the systems and methods disclosed herein, in some embodiments, provide an HVAC system well suited for selective configuration to quickly detect and control indoor humidity. In some embodiments, an increase in speed of detection of changes in indoor humidity may at least partially be attributed to the disclosed systems and methods capability of allowing the systems and/or a user of the systems to prioritize which of a plurality of differently located humidity sensors will be relied upon to provide feedback for controlling the system.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
 a plurality of humidity sensors, wherein each of the plurality of humidity sensors is associated with at least one of a plurality of zones;
 a system component configured to adjust a humidity of circulating air in each of the plurality of zones; and
 a controller comprising a user interface configured to display a list of the plurality of zones and allow selection of a humidity priority sensor via selection of a humidity priority zone from the list of the plurality of zones displayed on the user interface, wherein a humidity priority indicator is displayed on the user interface to indicate which zone displayed in the list of the plurality of zones is selected as the priority humidity zone, and wherein the controller is configured to operate the system component of the HVAC system to adjust the humidity of circulating air in each of the plurality of zones in response to feedback from only the humidity priority sensor to an exclusion of feedback from each of the other humidity sensors.

2. The HVAC system of claim 1, wherein at least one of the plurality of humidity sensors is located remotely from the controller.

3. The HVAC system of claim 1, wherein the controller is configured to operate the system component of the HVAC system to reduce the humidity of the circulating air in each of the plurality of zones in response to the humidity priority sensor sensing the humidity being greater than a target humidity associated with the humidity priority zone.

4. The HVAC system of claim 1, wherein the controller is configured to allow a user to specify a different target humidity to each of the plurality of humidity sensors.

5. A method of controlling humidity, comprising:
 providing a plurality of humidity sensors, wherein each of the plurality of humidity sensors is associated with at least one of a plurality of zones;
 providing a system component configured to adjust a humidity of circulating air in each of the plurality of zones;
 providing a system controller comprising a user interface, wherein the system controller is configured to monitor the plurality of humidity sensors;
 assigning one of the plurality of humidity sensors as a humidity priority sensor via selection of a humidity priority zone from a list of the plurality of zones displayed on the user interface;
 indicating the priority humidity zone on the user interface; and
 operating the system component to adjust the humidity of circulating air in each of the plurality of zones in response to feedback received by the system controller from only the humidity priority sensor to an exclusion of feedback from each of the other humidity sensors.

6. The method of claim 5, wherein the operating the system component to adjust the humidity occurs in response to a comparison between the humidity in the priority humidity zone as measured by the priority humidity sensor being greater than a target humidity setting associated with the priority humidity zone.

7. The method of claim 5, wherein the plurality of humidity sensors are components of a first HVAC system.

8. The method of claim 5, wherein at least one of the plurality of humidity sensors is a component of a first HVAC system, and wherein at least one of the plurality of remaining humidity sensors is a component of a second HVAC system.

9. The method of claim 8, wherein the humidity priority sensor is the component of the first HVAC system, and wherein the operating the system component to adjust the humidity comprises operating the first HVAC system.

10. The method of claim 9, wherein the humidity priority zone is presented as a virtual button on the user interface, wherein the user interface comprises a touchscreen interface.

11. The method of claim 5, wherein the assigning is performed automatically based on historical feedback from the plurality of humidity sensors.

12. The method of claim 5, wherein the operating the system component to adjust the humidity is performed in response to the humidity in the priority humidity zone as measured by the priority humidity sensor being greater than a target humidity setting associated with the priority humidity zone.

13. The method of claim 12, further comprising:
entering the target humidity into a system controller of at least one of the first HVAC system and the second HVAC system.

14. A system controller for a heating, ventilation, and/or air conditioning (HVAC) system, comprising:
a user interface configured to display a list of zones conditioned by the HVAC system, each zone comprising at least one of a plurality of humidity sensors;
wherein the system controller is configured to allow a user to select one of the plurality of humidity sensors as a priority humidity sensor by selecting a priority humidity zone from the list of zones displayed on the user interface, wherein selection of the priority humidity zone on the user interface assigns the humidity sensor from the plurality of humidity sensors associated with the priority humidity zone as the priority humidity sensor, wherein a humidity priority indicator is displayed on the user interface to indicate which zone displayed in the list of zones is selected as the priority humidity zone, and wherein feedback from the priority humidity sensor affects operation of the HVAC system to an exclusion of each of the other non-selected humidity sensors; and
wherein the system controller is configured to operate a system component of the HVAC system to adjust the humidity of circulating air in each of the zones in response to feedback from only the priority humidity sensor to an exclusion of feedback from each of the other humidity sensors.

15. The system controller of claim 14, wherein at least one of the plurality of humidity sensors is located remotely from the system controller.

16. The system controller of claim 14, wherein the system controller is configured to associate a first target humidity with a first humidity sensor of the plurality of humidity sensors for use during the operation of the HVAC system in a cooling mode, and wherein the system controller is configured to associate a second target humidity with the first humidity sensor for use during the operation of the HVAC system in a heating mode.

17. The system controller of claim 16, wherein the first target humidity may be selected from a first range of values and wherein the second target humidity may be selected from a second range of values different from the first range of values.

18. The HVAC system of claim 1, wherein the controller is configured to automatically select which of the plurality of humidity sensors affects operation of the HVAC system based on historical feedback from one or more of the plurality of humidity sensors.

19. The HVAC system of claim 18, wherein a manual selection of a different humidity priority sensor via selection of a humidity priority zone from the list of zones displayed on the user interface overrides the automatic selection made by the controller.

20. The HVAC system of claim 3, wherein the controller is configured to operate the system component of the HVAC system to increase the humidity of the circulating air in each of the plurality of zones in response to the humidity priority sensor sensing the humidity being less than a target humidity associated with the humidity priority zone.

* * * * *